Jan. 2, 1968 W. P. REID 3,361,430
TEMPERATURE COMPENSATING SEAL
Filed Aug. 23, 1965 2 Sheets-Sheet 1

INVENTOR.
WILLIAM P. REID
BY Paul A. Weilein
ATTORNEY

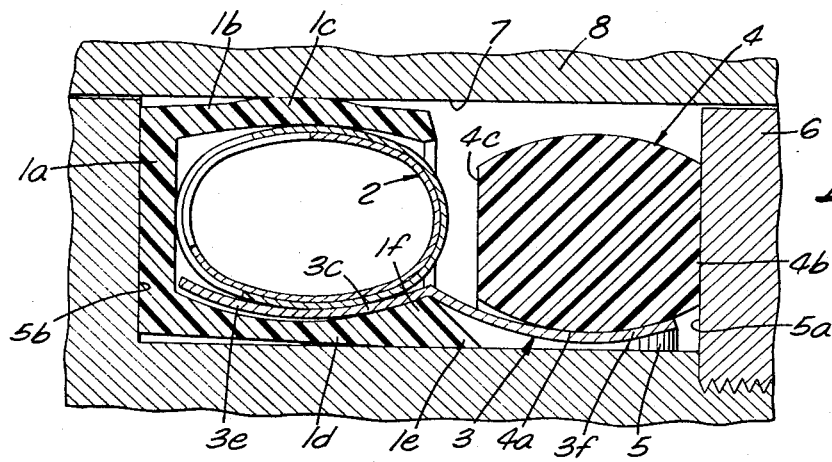

United States Patent Office 3,361,430
Patented Jan. 2, 1968

3,361,430
TEMPERATURE COMPENSATING SEAL
William P. Reid, Long Beach, Calif., assignor to Aeroquip Corporation, Jackson, Mich., a corporation of Michigan
Filed Aug. 23, 1965, Ser. No. 481,569
16 Claims. (Cl. 277—26)

ABSTRACT OF THE DISCLOSURE

A temperature compensating sealing ring assembly in which a flexible sealing ring of channel shaped section is mountable in a seal chamber, the sealing ring having side walls forceable outwardly into pressure engagement with rigid surfaces of the seal chamber by means of a transversely curved circumferentially extending force transmitting means positioned between the sealing ring side walls and being operably movable to apply forces acting outwardly in opposite directions against the side walls in accordance with a ring member which is expandable and contractable in response to temperature variations, the force transmitting means being interposed between a circumferentially extending sealing section on one of said walls and an end of a circumferentially extending lever structure in which a plurality of lever members are interconnected with one another at their alternate ends, such lever structure being fulcrumed on the free extremity of the other side wall and having an outwardly projecting end engaged by the temperature responsive ring member. Further, by making the force transmitting means of spirally wound resilient spring ribbon material, the side walls are normally preloaded with pressure sealing forces, which are modulated and varied by the temperature responsive means acting through the lever structure upon the force transmitting means.

In a modified structure, the projecting end of the lever structure is curved across the opening of the sealing ring channel and is engaged by a camming surface provided on the temperature responsive ring.

---

The present invention relates to sealing means and more particularly to a seal which is adapted for use in a wide range of temperatures and pressures.

An object of the present invention is to provide a sealing ring having means which responds to a change in temperature to vary the force which loads the seal ring surfaces against the walls of a recess in which the seal ring is disposed.

Heretofore the provision of a seal which functions effectively at ambient temperature or temperatures above ambient temperature and which will also function effectively at temperatures below ambient, has posed a problem due to the fact that materials of which resilient seal rings may be composed have characteristics which are detrimental to the sealing efficiency as the temperature varies. In other words, the shrinking of a seal ring caused by exposure to extreme cold as encountered in cryogenic applications where the temperatures range below —200° F. creates a tendency for the seal to pull away from the walls of the members between which the seal is disposed unless the sealing ring is preloaded into sealing engagement with sufficient force to resist the inherent shrinkage. However, such preloading is detrimental to the seal when operating at ambient temperature or superambient temperature.

In view of the foregoing, it is another object of the invention to provide a seal which is responsive to temperature variations in the sense that the seal is initially preloaded into sealing engagement with the walls of a seal chamber so as to effectively seal at one temperature, which may be ambient or superambient temperatures, and in response to reduction in temperature the seal ring is progressively more forcefully loaded into sealing contact with the walls of the chamber.

A problem exists also in connection with seals employed under temperature conditions wherein the seal elements are subjected to temperatures well above ambient and wherein there is a tendency for expansion of the seal ring to have a detrimental effect on seal efficiency.

In view of the foregoing it is still another object of the invention to provide a seal which is responsive to temperature variations in the sense that the seal is initially preloaded into sealing engagement with the walls of a seal chamber so as to effectively seal at one temperature and which in response to elevation in temperature the seal is more forcefully loaded into sealing contact with the walls of the chamber.

In accomplishing the foregoing objectives, it is a further objective to provide a seal assembly in which an actuator member is combined with the seal ring in such a manner that the actuator member will contract or expand responsive to lowering or raising of the environmental temperatures respectively to more or less apply a loading force to the seal ring to maintain its sealing effectiveness.

In a more specific sense, it is an object of the invention to provide a seal assembly wherein essentially a U-cup seal, that is, a ring having an open channel, is provided with a spring within the side walls of the cup, which spring is initially deformed upon installation of the seal in a seal chamber to preload the seal ring walls into sealing engagement with the rigid surfaces of a seal chamber and wherein temperature responsive means are employed to vary the loading of the U-cup walls against the opposing surfaces of the seal chamber.

Other objects and advantages of the invention will be hereinafter described or will become apparent to those skilled in the art, and the novel features of the invention will be defined in the appended claims.

In the drawings:

FIG. 4 is a view corresponding to FIG. 3 but illustrating the seal subjected to relatively low temperature;

FIG. 5 is a fragmentary view in elevation illustrating the lever means of the invention;

FIG. 6 is a view corresponding to FIG. 3, but illustrating a modified seal construction; and FIG. 7 is a view corresponding to FIG. 3, but illustrating another form of the invention.

Like reference characters in the several views of the drawings and in the following description designate corresponding parts.

Figure 1:
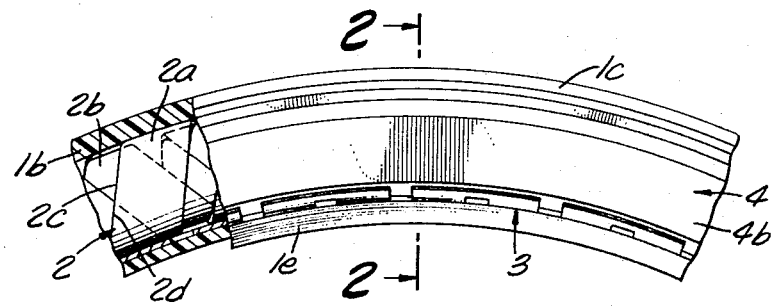
FIG. 1 is a fragmentary view in end elevation illustrating an embodiment of the present invention.
Figure 2:
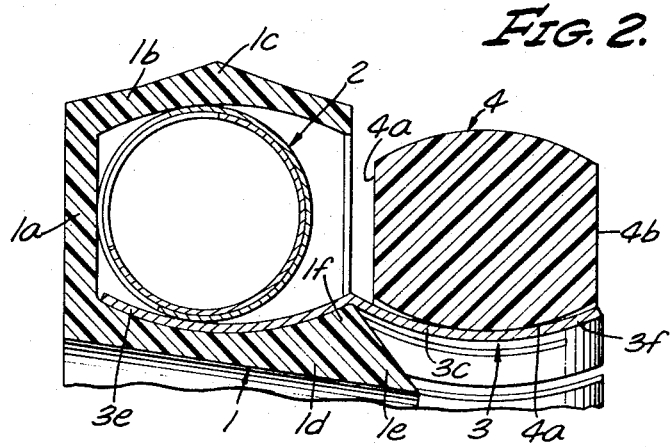
FIG. 2 is a view in section as taken on the line 2—2 of FIG. 1.

Referring to FIGS. 1 and 2, it will be appreciated that the seal assembly is in the form of an annulus only a segment of which has been shown in FIG. 1.

Included in the assembly is a sealing cup generally denoted at 1, of U-shape section having within its open channel or cavity a preloading spring generally denoted at 2 and also having within the cavity a portion of lever means generally denoted at 3, this lever means supporting an annular temperature responsive member generally denoted at 4.

Figure 3:
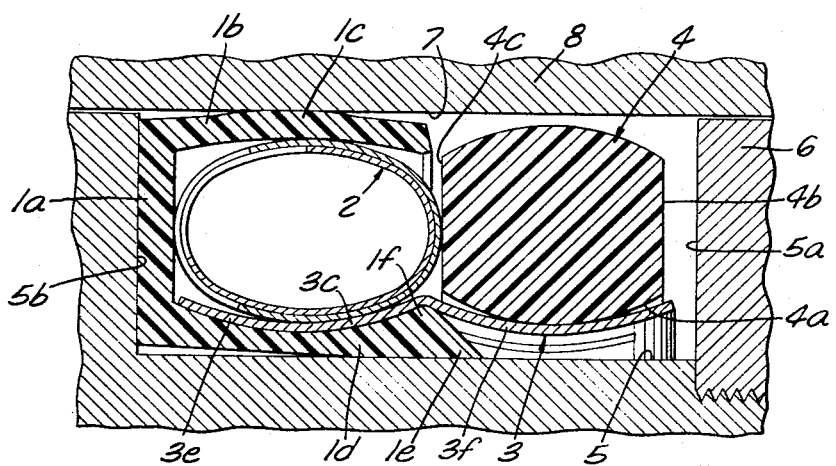
FIG. 3 is a view illustrating the seal of FIG. 2 installed in a seal chamber and under normal or ambient temperature conditions.

In general, the seal construction is one in which, when installed as shown in FIG. 3 in a seal chamber, the preloading spring 2 is deformed and walls of the cup are preloaded into sealing engagement with the chamber surfaces, the temperature responsive member 4 and the lever means 3 acting to cause the chamber surface contacting portion of the cup 1 to be more or less pressure loaded into sealing contact with the chamber walls responsive to variations in the environmental temperature which may range from superambient temperatures to temperatures below −200° F. in cryogenic application.

More specifically, the U-cup 1 is a modified U-cup construction in the sense that it consists of a base wall 1a having at one side a side wall 1b projecting therefrom and being provided externally substantially at its midsection with an outwardly projecting circumferentially continuous protuberant sealing portion 1c. The sealing cup 1 has a wall 1d which is provided adjacent its outer extremity with a circumferentially continuous protuberant sealing portion 1e in the form of a lip, and internally of the wall 1b at the free end thereof but inwardly spaced from the lip 1e is an annular ridge 1f which constitutes a fulcrum point for the lever means 3 as will hereinafter more fully appear. The spring means 2 is confined between the side walls 1b and 1d of the cup 1 and engages the base wall 1a and also engages the side wall 1b at a region which is substantially aligned with the outer protuberant sealing portion 1c of the wall 1b.

Preferably, the spring means 2, as best seen in FIG. 1, is composed of a pair of oppositely helically arranged ribbon-like spring elements 2a and 2b, the latter being disposed internally of the former, though other spring forms may be employed. The spring means 2 may be initially formed linearly whereby upon flexure of the linear spring member to circular form and installation within the cavity of the U-cup 1, the ends will be in substantially opposing or abutting relation so as to provide substantially circumferentially continuous support for and pressure surface contact with the insides of the cup walls 1b and 1d.

The lever means 3, as best illustrated in FIG. 5, may also be formed linearly by stamping of the same from strip stock to provide alternate slots 3a and 3b opening at the opposite longitudinal edges of the linear lever member 3 to provide a plurality of lever sections 3c joined by webs 3d. As in the case of the spring means 2, the lever member 3 is adapted to be deformed to circular form so that its ends will substantially abut or be in close contiguous relation within the cavity of the cup 1, the lever sections 3c then forming a plurality of circumferentially spaced but closely adjacent levers. In addition, as clearly seen in FIG. 2, for example, the lever means 3 is so formed that a seat is provided medially of each lever section 3c, this seat being adapted to engage the protuberant ridge 1f of the cup wall 1d so as to fulcrum thereon.

In the illustrative embodiment, each lever 3c has an arm 3e which extends into the cavity of the cup 1 between the spring 2 and the side wall 1d and a second arm 3f which projects outwardly of the cup cavity so as to be engaged by the temperature responsive means. As here shown, the arm 3e is slightly arcuate so as to conform to the correspondingly arcuate inside surface of the cup wall 1d and the lever arm 3f is likewise arcuately formed to accommodate or form a seat for the annular temperature responsive member 4.

The temperature responsive member 4 comprises an annular body which will have a tendency to change size circumferentially when subjected to temperature change and in the illustrative embodiment to shrink when subjected to reduced temperatures. The temperature responsive ring 4 has an arcuate inner peripheral wall 4a which engages in the seats of the lever arms 3f and in this embodiment the ring 4 has straight end walls 4b and 4c, the former of which, when the ring is installed on the seats provided by the lever arms 3f, is in spaced relation to the spring 4.

The assembly thus far described is adapted to be installed in a variety of seal chambers. In FIG. 3 one such seal chamber is shown as being provided by a groove 5 formed in a piston member 6, the groove having end walls or rigid surfaces 5a and 5b, the latter of which is engaged by the end wall 1a of the cup 1. The annular sealing ridge 1e at the outer extremity of the cup wall 1d engages the cylindrical base of the groove 5 while the outer annular protuberant sealing portion 1c on cup wall 1b engages the cylindrical inner wall 7 provided by a cylinder 8. It will also be observed that at the annular regions of sealing contact with the cylindrical seal chamber surfaces, the cup walls 1b and 1d are slightly deformed or flattened under pressure provided by the preloading spring 2 which has been deformed between the cup walls, the space between the relaxed spring 2 and the temperature responsive ring 4 enabling such deformation of the spring 2.

Referring to FIG. 4, it will be observed that upon circumferential shrinkage of the temperature responsive ring 4 when subjected to cold, the ring applies an actuating force to the levers 3c of the lever means 3, the levers fulcrumming about the fulcrum edge 1f of the cup wall 1d and applying a force to the preload spring 2 which is transmitted to the cup wall 1c to effect additional loading of the respective annular sealing protuberances 1c and 1e against the cylindrical surfaces of the seal chamber. Under these conditions it will be recognized that the pressure loading of the cup walls 1c and 1d under the lever means 3 is a function of temperature.

Various materials may be employed in the construction of the sealing cup 1 as well as in the temperature responsive ring 4, the materials either being similar or dissimilar. As examples, the sealing cup 1 may be composed of Teflon or similar fluorocarbon resin material and the temperature responsive ring 4 may be of the same material. If preferred, all of the components may be composed of metal or they may be combinations of plastic and metal.

It will also be appreciated that the temperature responsive ring 4 may be employed to apply a desired preloading force to the sealing ridges of the cup under ambient temperature, but the ring would expand as the temperature increases so as to reduce loading forces on the sealing ridges which, of course, become more pliant as the temperature rises in the case of the fluorocarbon resins.

The essence of the invention is that a construction is provided whereby thermal expansion and contraction of the temperature responsive ring 4 will apply more or less loading force to the sealing lips or side walls of the cup 1.

In FIG. 6 a modified construction is shown illustrating the application of a seal assembly made in accordance with the invention to a seal chamber defined between radially extended faces 17 and 15. In this modified arrangement the cup member is designated 10 and has a wall 10b provided with a circumferentially continuous sealing ridge or protuberant portion 10c, and the cup wall 10d having at its outer extremity the sealing ridge 10e engageable with the wall 17 forming a part of the seal chamber. In this embodiment the seal ring channel opens radially, whereas in the first embodiment the channel opens axially. The preloading spring is designated 12 and may be of a construction similar to that described in the first embodiment. In FIG. 6, however, the lever means generally denoted at 13 is slightly modified so as to project arcuately from the chamber, that is, to project past the open channel of the U-cup. The temperature responsive ring designated 14 is of generally right triangular construction having its wall 14a adapted to effect a camming action on the lever arms 13 as the temperature responsive ring 14 shrinks.

In FIG. 7 another modified construction is shown which, in accordance with the objectives of the invention, is so constructed as to maintain sealing pressure contact between a side wall of the cup and a surface within the seal chamber when a rise in temperature above ambient temperature, for example, would ordinarily tend to cause the just mentioned seal wall to expand and, therefore, tend to break sealing contact with the chamber surface. The difference in this modified construction from that described in connection with FIGS. 1–5, may be seen to reside in the fact that the wall 1d of the seal ring 1 of the first described embodiment is at the inner periphery of that seal ring, whereas in FIG. 7 the wall designated 101d is at the outer periphery of the seal ring and the preloading spring 102 is adapted to maintain initial sealing contact between the cup wall 101d and an outer cylindrical surface 107 and between the inner peripheral seal wall 101b and an inner cylindrical surface 105, which cylindrical surfaces are disposed in parallel relation so as to define the peripheral walls of a seal chamber. This chamber also includes an end wall 105f with which the base wall 101a of the seal ring abuts.

As in the first described embodiment, the seal ring wall 101d has a ridge 101f which provides a fulcrum for the lever means also generally denoted 3 in this embodiment and including a plurality of lever elements having an arm 103e engageable with the seal wall 101d and a lever arm 103c engageable by the temperature responsive ring generally denoted at 4. As in the first described embodiment, this temperature responsive ring has an arcuate surface 104a adapted to seat in and circumferentially extend about the lever arms 103c.

In the operation of the embodiment of FIG. 7, it will be observed that the initial sealing contact is between the lip portion 101e of the wall 101b and between the annular protuberant sealing portion 101c of the seal wall 101b. However, upon expansion of the sealing ring assembly of FIG. 7 relative to the cylindrical chamber surface 105, there will be a tendency of the protuberant sealing portion 101c to move away from the surface 105, which tendency is overcome by the expansive tendency of the temperature responsive ring 104 which will cause a rocking of the lever elements so as to move the lever arms 103e toward the inner cylindrical chamber surface 105, thereby maintaining the loading of the protuberant sealing portion 101c against the surface 105.

While the specific details of two illustrative embodiments of the invention have been herein shown and described, variations in the details of construction of the seal cup and the temperature responsive ring as well as in the configuration of the lever means and the preloading spring may be availed of without departing from the spirit of the invention as defined in the appended claims.

I claim:
1. A sealing ring assembly for use between relatively rigid surfaces forming a seal chamber, comprising: a flexible sealing ring of channel shape in cross section having a pair of side walls for circumferentially engaging said rigid surfaces; force transmitting means positioned between said side walls and being movably operable to apply variable loading forces in opposite directions on said side walls to hold them in pressure engagement with said surfaces; a member movably responsive to temperature variations; and connecting means between said member and said force transmitting means to control the movements of said force transmitting means in accordance with the action of said member.

2. The sealing ring assembly as set forth in claim 1, wherein said temperature responsive member comprises an actuator ring disposed opposite the open side of the sealing ring and operable to contract and expand in response to temperature variations.

3. A sealing ring assembly as set forth in claim 1, wherein the force transmitting means comprises a structure having a curved section confined between the sealing ring side walls and acting under the transmitted forces to urge the same outwardly into sealing position.

4. A sealing ring assembly as defined in claim 1, wherein one of said side walls has a circumferential sealing section located medially thereof and the other of said side walls has a circumferential sealing section located adjacent the free extremity thereof, and the connecting means includes lever means fulcrumed on the free extremity of said other wall.

5. A sealing ring assembly as defined in claim 4, wherein said force transmitting means are interposed between said lever means in said open channel and engageable with said one wall substantially in alignment with said medially located sealing section.

6. A sealing ring assembly as defined in claim 5, wherein said force transmitting means comprise resilient means for applying a preloading force between said side walls.

7. A sealing ring assembly as defined in claim 4, wherein said channel opens axially of said seal ring, said temperature responsive member comprises a ring spaced from said open channel and coaxial with said sealing ring, and the lever means projects from said open channel axially of said sealing ring and is engaged by said temperature responsive ring.

8. A sealing ring assembly as defined in claim 4, wherein said channel opens radially of said sealing ring, said temperature responsive member comprises a ring spaced from said open channel and coaxial with said sealing ring, and the lever means projects from said open channel radially of said sealing ring and are engaged by said temperature responsive ring.

9. A sealing ring assembly as defined in claim 6, wherein said lever means includes a plurality of lever elements circumferentially spaced about said seal ring and each having an arm interposed between said resilient means and one of said side walls and another arm projecting from said open channel, responsive to the action of said temperature responsive means.

10. A sealing ring assembly as defined in claim 8, wherein said lever means includes a plurality of lever elements spaced circumferentially of said ring, each lever element having an arm extending into said channel and another arm projecting from said channel across the opening of said channel, and the temperature responsive ring is a camming ring engaged with said projecting lever arms and circumferentially expansible and contractable in response to variation in temperature.

11. A sealing ring assembly as defined in claim 9, wherein said lever elements are interconnected with one another at their alternate ends.

12. A sealing ring assembly for use between relatively rigid surfaces forming a seal chamber, comprising: a flexible sealing ring of open channel shape in cross section having a pair of side walls; one of said side walls having externally thereof an annular protuberant sealing portion located medially of said side wall; the other side wall having at its free end circumferentially extended means forming a fulcrum; a series of circumferentially spaced lever elements pivoted on said fulcrum and having one arm disposed in said channel and another arm projecting from said channel; circular spring means disposed in said channel and engaged with said one lever arm and engaging said one of said side walls in alignment with said annular protuberant sealing portion; and a temperature responsive member acting on said projecting arms of said lever elements to cause pivotal movement of said lever upon variation in the temperature to which said temperature responsive member is subjected.

13. A sealing ring assembly as defined in claim 12, wherein said sealing ring is composed of a fluorocarbon resin.

14. A sealing ring assembly as defined in claim 12, wherein said sealing ring is composed of a fluorocarbon resin and said temperature responsive member comprises a ring composed of a fluorocarbon resin.

15. A sealing ring assembly as defined in claim 12, wherein said other side wall constitutes the inner peripheral wall of said sealing ring and said temperature responsive member comprises a ring externally disposed about the projecting arms of said lever elements.

16. A sealing ring assembly as defined in claim 12, wherein said other side wall constitutes the outer peripheral wall of said sealing ring and said temperature responsive member comprises a ring externally disposed within the projecting arms of said lever elements.

References Cited

UNITED STATES PATENTS

| | | | |
|---|---|---|---|
| 2,253,904 | 8/1941 | Haug | 277—26 |
| 3,223,426 | 12/1965 | Reid | 277—206 X |
| 3,301,568 | 1/1967 | Perry | 277—206 X |

SAMUEL ROTHBERG, *Primary Examiner.*